United States Patent [19]

Fukui et al.

[11] Patent Number: 5,264,531
[45] Date of Patent: Nov. 23, 1993

[54] ACRYLONITRILE COPOLYMER, AND FIBER OR CORE-SHEATH CONJUGATE FIBER PREPARED THEREFROM

[75] Inventors: Yuichi Fukui; Tsuruyoshi Matsumoto; Hajime Itoh; Takeo Hamazaki; Itsumi Muraoka, all of Otake, Japan

[73] Assignee: Mitsubishi Rayon Co., Ltd., Japan

[21] Appl. No.: 777,535

[22] PCT Filed: Apr. 8, 1991

[86] PCT No.: PCT/JP91/00464
§ 371 Date: Dec. 9, 1991
§ 102(e) Date: Dec. 9, 1991

[87] PCT Pub. No.: WO91/15525
PCT Pub. Date: Oct. 17, 1991

[30] Foreign Application Priority Data

Apr. 9, 1990 [JP] Japan .................................. 2-092192
Apr. 17, 1990 [JP] Japan .................................. 2-100841
Apr. 17, 1990 [JP] Japan .................................. 2-100842

[51] Int. Cl.$^5$ ............................................. C08F 18/20
[52] U.S. Cl. ..................................... 526/245; 526/342
[58] Field of Search ................................ 526/245, 342

[56] References Cited

U.S. PATENT DOCUMENTS

| 2,682,527 | 6/1954 | Dickey et al. | 526/245 |
| 2,716,106 | 8/1955 | Gilbert et al. | 526/245 |
| 3,388,199 | 6/1968 | Chaney et al. | 526/245 |

FOREIGN PATENT DOCUMENTS

| 4414811 | 7/1969 | Japan | 526/245 |
| 59-179876 | 10/1984 | Japan . | |
| 62-10525 | 3/1987 | Japan . | |
| 62-179517 | 8/1987 | Japan . | |
| 1-148806 | 6/1989 | Japan . | |
| 158204 | 12/1989 | Japan . | |

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

The present invention relates to an acrylonitrile copolymer comprising 70% by weight or more of an acrylonitrile monomer unit and 0.1–30% by weight of a fluoroalkyl methacrylate or fluoroalkyl acrylate monomer unit and having an intrinsic viscosity of 0.8–10, as well as to an acrylonitrile type core-sheath conjugate fiber using the above copolymer as the sheath component. The copolymer according to the present invention has water repellency by itself; accordingly, the above conjugate fiber prepared therefrom also exhibits water repellency permanently.

2 Claims, No Drawings

ACRYLONITRILE COPOLYMER, AND FIBER OR CORE-SHEATH CONJUGATE FIBER PREPARED THEREFROM

TECHNICAL FIELD

The present invention relates to an acrylonitrile copolymer excellent in oil repellency, water repellency, weather resistance, chemical resistance and moist-heat resistance, as well as to a novel acrylonitrile fiber having water repellency permanently, prepared therefrom.

BACKGROUND ART

Acrylonitrile fibers are in wide use as a fiber for clothing.

A fiber having properties which enable fiber products produced therefrom to be protected from staining, has long been desired, and a number of researches have been made in order to obtain such a fiber. Also in particular fields such as outer clothing and the like, it is desired to endow a fiber with a function which suppresses the infiltration of water (e.g. rainwater) from outside into the fiber.

In order to meet these requirements, it is necessary to develop a technique for imparting water repellency to a fiber.

In order to obtain an acrylonitrile polymer improved in properties as mentioned above, it has been tried to modify acrylonitrile by converting it to various copolymers. Generally, however, it is conducted to subject an acrylonitrile polymer product to a post-treatment with a fluororesin, in order to endow the polymer with water repellency, oil repellency, etc.

As such a fluororesin, many kinds of resins including polyethylene tetrafluoride are disclosed. In particular, a number of fluoropolymer compositions as an agent for treatment of fiber products are disclosed. For example, Japanese Patent Application Kokai (Laid-Open) No. 53-22547 discloses a water-repellent and oil-repellent agent consisting of a copolymer containing at least 40% by weight of a polymerizable compound having a perfluoroalkyl group of 4–16 carbon atoms and 10–60% by weight of vinylidene chloride. Japanese Patent Application Kokai (Laid-Open) No. 51-133511 discloses a composition for paper treatment consisting of at least 35% by weight of a polymerizable compound having a perfluoroalkyl group of 3–20 carbon atoms, 35–60% by weight of vinylidene chloride and 0.5–5% by weight of N-methylolacrylamide or N-methylolmethacrylamide. Also, Japanese Patent Application Kokai (Laid-Open) No. 62-179517 discloses a solid fluoropolymer of water repellency and oil repellency consisting of 40–75% by weight of a perfluoroalkylethyl acrylate monomer, 10–35% by weight of vinylidene chloride and 10–25% by weight of an alkyl acrylate or alkyl methacrylate monomer. Also, Japanese Patent Application Kokoku (Post-Examined) No. 1-58204 discloses a process for producing a fluoroalkyl (meth)acrylate polymer excellent in heat resistance consisting of 70% by weight or more of a fluoroalkyl methacrylate or a fluoroalkyl acrylate and 30% by weight or less of a vinyl monomer.

As the post-treatment method for imparting a particular water repellency agent to a fiber product, it is proposed in, for example, Japanese Patent Application Kokai (laid-Open) No. 59-179876 to form a fluororesin film on the surface of the fiber.

The fiber product subjected to such a post-treatment, however, has a drawback in that the water repellency agent is easily detached by washing or the like.

As the method for treating an acrylonitrile fiber product with said resin, there is ordinarily used a method which comprises spraying a material to be treated, with an aqueous latex of said resin or an organic solvent solution of said resin, or immersing the material to be treated, in a resin solution and subjecting the resulting material to dehydration, etc. to adhere said resin to the material to be treated, and then carrying out drying and heat treatment to form a film of said resin on the surface of the fiber. In this method, however, there easily appear specks caused by the treatment, and increase in the amount of said resin adhered invites a problem in processing. There is also a problem in durabilities of fluorine properties such as washing resistance and the like.

Further, a fluororesin, for example, an ethylene tetrafluoride resin, in particular, is difficult to process by high-pressure extrusion, emulsion shaping, sintering or the like, and is expensive.

In order to solve these problems, the present inventors made extensive study on the structure of polymer per se. As a result, the present inventors developed a completely novel acrylonitrile copolymer and has reached the present invention.

The present inventors made study also on making the novel acrylonitrile copolymer into a fiber. As a result, the present inventors found that a fiber having water repellency permanently or a core-sheath conjugate fiber using the fiber as the sheath component can be obtained, and completed the present invention.

The present invention resides in an acrylonitrile copolymer comprising 70% by weight or more of an acrylonitrile monomer unit and 0.1–30% by weight of a fluoroalkyl methacrylate or fluoroalkyl acrylate monomer unit and having an intrinsic viscosity of 0.8–10.

The present invention further resides in an acrylonitrile fiber prepared from such an acrylonitrile copolymer, or an acrylonitrile type core-sheath conjugate fiber containing such an acrylonitrile copolymer as the sheath component.

DISCLOSURE OF THE INVENTION

The acrylonitrile copolymer of the present invention is required to contain 70% by weight or more of an acrylonitrile monomer unit. When the amount of the acrylonitrile monomer unit is less than 70% by weight, the properties of acrylonitrile polymer are lost. The present acrylonitrile copolymer is also required to contain 0.1–30% by weight of a fluoroalkyl methacrylate or fluoroalkyl acrylate monomer unit. When the amount of this monomer unit is less than 0.1% by weight, the properties of fluororesin do not appear. When the amount exceeds 30% by weight, the properties of acrylonitrile polymer are lost and simultaneously there arises a problem that the resulting copolymer has inferior solubility in solvent at the time of shaping. In such a case, it is also difficult to obtain stable spinning.

The intrinsic viscosity of the copolymer of the present invention is 0.8–10. When the intrinsic viscosity is less than 0.8, it is impossible to obtain a shaped material of sufficient flexibility when shaping is made using a solvent. For example, a film after solvent evaporation is brittle. Further, when a copolymer of an intrinsic viscosity of less than 0.8 is spun in a fiber from a solution state, no sufficient spinnability is obtained. Therefore, no sufficient spinnability is obtained also when such a copolymer is spun in a core-sheath conjugate fiber containing said copolymer as the sheath component. Meanwhile, when the intrinsic viscosity exceeds 10, the resulting solution viscosity is high and the shapability is very poor. In this case, it is difficult to obtain stable spinning when spinning is made or when such a copolymer is spun in a core-sheath conjugate fiber containing said copolymer as the sheath component.

The present invention is characterized in that a copolymer of acrylonitrile with a fluorine-containing monomer is prepared so that the copolymer is endowed with water repellency.

In the present invention, as the fluorine-containing monomer, there is used a monomer that can easily copolymerize with acrylonitrile and that can polymerize at normal pressure. From such a viewpoint, a fluoroalkyl (meth)acrylate is a very convenient monomer.

For example, there can be mentioned acrylic acid esters or methacrylic acid esters or their mixtures, in all of which the alcohol moiety is selected from the group consisting of $CF_3(CF_2)_nCH_2OH$ (n=0, 1, 2, 3, 5), $CHF_2(CF_2)_nCH_2OH$ (n=1, 3) and $CF_3(CF_2)_7CH_2CH_2OH$.

Among them, particularly preferable is an acrylic acid ester (17FA) or a methacrylic acid ester (hereinafter abbreviated to 17FM), both containing, as the alcohol moiety, $CF_3(CF_2)_7CH_2CH_2OH$, because they enable efficient introduction of fluorine into polymer molecule.

By copolymerizing the fluorine-containig monomer in a range of 0.1-30% by weight with acrylonitrile, initial water repellency is exhibited. When the fluorine-containing monomer exceed the above range, there is no change in water repellency and such a range is merely uneconomical. Incidentally, in order to impart other property to the extent that the water repellency is not sacrificed, it is no problem to use a third component in the copolymerization in a proportion of less than 30% by weight.

As the third component, there are mentioned, for example, methacrylic acid esters and acrylic acid esters such as methyl methacrylate, ethyl methacrylate, butyl methacrylate, hexyl methacrylate, methyl acrylate, ethyl acrylate, butyl acrylate, propyl acrylate and the like; halogenated vinyls such as vinyl chloride, vinyl bromide, vinylidene chloride and the like; acids such as methacrylic acid, acrylic acid, itaconic acid, crotonic acid, vinylsulfonic acid and the like, and their salts; maleimide; phenylmaleimide; acrylamide; methacrylamide; styrene; α-methylstyrene; vinyl acetate; etc.

Such a polymer can be easily obtained by employing a so-called radical polymerization process conventionally used in polymerization of acrylonitrile, without giving any modification thereto. That is, it is possible to use any of an in-aqueous-system-precipitation polymerization process using water as a polymerization medium, a solution polymerization process, an emulsion polymerization process and a polymerization process described in Japanese Patent Application Kokai (Laid-Open) No. 61-12705, using a water-solvent (for polymer) mixture as a polymerization medium.

According to a polymerization process selected from the above, polymerization is carried out according to a conventional procedure using a monomer mixture consisting of acrylonitrile and a fluoroalkyl (meth)acrylate and a polymerization initiator.

The acrylonitrile fiber of the present invention is a water-repellent fiber which can be produced from the above-mentioned acrylonitrile copolymer without giving significant modification to the currently employed method for production of acrylonitrile fiber, i.e. the wet, dry-wet or dry spinning method.

The acrylonitrile copolymer of the present invention is soluble in solvents currently used in the production of acrylonitrile fiber.

In producing an acrylonitrile fiber of the present invention, the above copolymer is dissolved in a solvent conventionally used in spinning of acrylonitrile fiber, for example, dimethylformamide, dimethylacetamide, dimethyl sulfoxide, γ-butyrolactone, ethylene carbonate nitric acid, sulfuric acid, an aqueous solution of sodium thiocyanate, or the like, and the resulting solution is spun according to a conventional procedure according to a wet, dry-wet or dry spinning method and drawn.

The obtained fiber exhibits water repellency permanently because the polymer itself has water repellency.

Further, the acrylonitrile fiber of the present invention has additional features of excellent moist-heat resistance and low fiber-to-fiber friction.

Also, by using the above-mentioned acrylonitrile polymer as a sheath component and reducing the amount of an expensive functional polymer used, it is possible to obtain an acrylonitrile core-sheath conjugate fiber which is very economical and has a water-repellency permanently. Such a conjugate fiber can be produced by dissolving the above acrylonitrile copolymer in a solvent conventionally used in spinning of acrylonitrile fiber, for example, dimethylformamide, dimethylacetamide, dimethyl sulfoxide, γ-butyrolactone, ethylene carbonate, nitric acid, sulfuric acid, an aqueous solution of sodium thiocyanate, or the like, and then spinning the resulting solution using a spinneret for core-sheath conjugate spinning, according to a conventional procedure according to a wet, dry-wet or dry spinning method.

As the core component of the core-sheath conjugate fiber, there can be used any polymer as long as it can be spun from a solution state. In particular, a polymer containing an acrylonitrile monomer unit in an amount of at least 50% by weight is preferable in view of the adhesion to the sheath component. The monomer component other than acrylonitrile can be any monomer as long as it is copolymerizable with acrylonitrile, and can be selected depending upon the desired functions. With respect to the core/sheath component ratio, a sheath component proportion as low as possible is advantageous economically, but too low a sheath component proportion is unable to give sufficient water repellency; accordingly, there is preferred a core/ sheath component ratio of 30/1 or lower.

By making use of their characteristics, the acrylonitrile fiber and acrylonitrile type core-sheath conjugate fiber of the present invention can be used in outer clothing for sports, suits for marine sports, clothing for rainy weather such as raincoat, ordinary clothing such as sweater, trousers and the like, rain gear such as umbrella, wrapping cloth, diaper, hygienic goods, wall cloth, curtain, carpet, car seat, fiber for different-color ink ribbons, materials such as broom and brush, etc.

BEST MODE FOR CARRYING OUT THE INVENTION

The present invention is hereinafter described specifically by way of Examples. In the following Examples, part(s) and % refer to part(s) by weight and % by weight, and the intrinsic viscosity [η] is a measured value at 25° C. when dimethylformamide (DMF) was used as a solvent.

Water repellency was evaluated as follows according to the DuPont method. A test piece of 20 cm × 20 cm is attached to a metallic ring of 15 cm in diameter. Then, each of the mixed solvents corresponding to the grades shown in the following table is dropped on the three different places of the test piece in an amount of 0.05 ml per one place and then is allowed to stand for 10 seconds. After the 10 seconds, the grade of the test piece is determined depending upon whether or not the dropped solution has infiltrated into the test piece.

TABLE

| Grade | Composition of mixed solution | |
|---|---|---|
| | Isopropyl alcohol (parts) | Distilled water (parts) |
| 1 | 10 | 90 |
| 2 | 20 | 80 |
| 3 | 30 | 70 |
| 4 | 40 | 60 |
| 5 | 50 | 50 |

EXAMPLE 1

Into a reactor provided with a stirrer and a reflux condenser were fed 90 parts of acrylonitrile (hereinafter referred to as AN), 10 parts of 1H,1H,2H,2H-heptadecafluorodecyl methacrylate (hereinafter referred to as 17FM), 400 parts of water, 200 parts of dimethylacetamide (hereinafter referred to as DMAc) and 0.1 part of azobisisobutyronitrile. Each of AN, 17FM, water and DMAc was used after having been subjected to nitrogen bubbling for 1 hour. The mixture in the reactor was subjected to polymerization at 60° C. for 3 hours in a nitrogen stream. The yield of the resulting polymer was 52%. The polymer was subjected to elemental analysis of fluorine, and calculation from the analysis indicated that the polymer had a composition consisting of 88% of AN and 12% of 17FM. The polymer had an intrinsic viscosity [η] of 2.80.

The polymer was dissolved in dimethylacetamide in a 17% concentration. The resulting solution was wet-spun according to a conventional procedure using a 70% aqeuous dimethylacetamide solution as a coagulating solution, after which drawing to a 4.5-fold length was conducted in boiling water to obtain a fiber. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes. The property showed no change even after 50 times of washing.

EXAMPLE 2

Into a reactor provided with a stirrer and a reflux condenser were fed 95 parts of AN, 5 parts of 17FM, 600 parts of DMAc and 0.1 part of 2,2-azobis(4-methoxy-2,4-dimethyl-valeronitrile). Each of AN, 17FM, and DMAc was used after having been subjected to nitrogen bubbling for 1 hour. The mixture in the reactor was subjected to polymerization at 50° C. for 3 hours in a nitrogen stream. The yield of the resulting polymer was 49%. The polymer was subjected to elemental analysis of fluorine, and calculation from the analysis indicated that the polymer had a composition consisting of 92% of AN and 8% of 17FM. The polymer had an intrinsic viscosity [η] of 2.22.

The polymer was dissolved in dimethylacetamide in a 17% concentration. The resulting solution was wet-spun according to a conventional procedure using a 70% aqueous dimethylacetamide solution as a coagulating solution, after which drawing to a 4.5-fold length was conducted in boiling water to obtain a fiber. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes. The property showed no change even after 50 times of washing.

EXAMPLE 3

Into a reactor provided with a stirrer and a reflux condenser were fed 95 parts of AN, 5 parts of 17FM, 600 parts of water, 0.75 part of $(NH_4)_2S_2O_8$, 3.07 parts of $NaHSO_3$, 0.25 part of $H_2SO_4$ and 0.4 ppm, relative to the monomers, of $Fe^{2+}$. Each of AN, 17FM and water was used after having been subjected to nitrogen bubbling for 1 hour. The mixture in the reactor was subjected to polymerization at 50° C. for 3 hours in a nitrogen stream. The yield of the resulting polymer was 83%. The polymer was subjected to elemental analysis of fluorine, and calculation from the analysis indicated that the polymer had a composition consisting of 93% of AN and 7% of 17FM. The polymer had an intrinsic viscosity [η] of 1.87.

The polymer was dissolved in dimethylacetamide in a 20% concentration. The resulting solution was wet-spun according to a conventional procedure using a 70% aqueous dimethylacetamide solution as a coagulating solution, after which drawing to a 4.0-fold length was conducted in boiling water to obtain a fiber. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes. The property showed no change even after 50 times of washing.

EXAMPLE 4

Into a reactor provided with a stirrer and a reflux condenser were fed 90 parts of AN, 10 parts of 1H,1H,5H-octafluoropentyl methacrylate (hereinafter 8FM), 400 parts of water, 200 parts of DMAc and 0.1 part of 2,2-azobis(4-methoxy-2,4-dimethylvaleronitrile). Each of AN, 8FM, water and DMAc was used after having been subjected to nitrogen bubbling for 1 hour. The mixture in the reactor was subjected to polymerization at 50° C. for 3 hours in a nitrogen stream. The yield of the resulting polymer was 62%. The polymer was subjected to elemental analysis of fluorine, and calculation from the analysis indicated that the polymer had a composition consisting of 85% of AN and 15% of 8FM. The polymer had an intrinsic viscosity [η] of 2.75.

The polymer was dissolved in dimethylacetamide in a 17% concentration. The resulting solution was wet-spun according to a conventional procedure using a 70% aqueous dimethylacetamide solution as a coagulating solution, after which drawing to a 4.5-fold length was conducted in boiling water to obtain a fiber. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes. The property showed no change even after 50 times of washing.

EXAMPLE 5

Into a reactor provided with a stirrer and a reflux condenser were fed 75 parts of AN, 25 parts of 8FM, 600 parts of DMAc and 0.1 part of 2,2-azobis(4-methoxy-2,4-dimethyl-valeronitrile). Each of AN, 8FM, and DMAc was used after having been subjected to nitrogen bubbling for 1 hour. The mixture in the reactor was subjected to polymerization at 50° C. for 3 hours in a nitrogen stream. The yield of the resulting polymer was 61%. The polymer was subjected to elemental analysis of fluorine, and calculation from the analysis indicated that the polymer had a composition consisting of 71% of AN and 29% of 8FM. The polymer had an intrinsic viscosity $[\eta]$ of 1.08.

The polymer was dissolved in dimethylacetamide in a 25% concentration. The resulting solution was wet-spun according to a conventional procedure using a 70% aqueous dimethylacetamide solution as a coagulating solution, after which drawing to a 4-fold length was conducted in boiling water to obtain a fiber. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes. The property showed no change even after 50 times of washing.

EXAMPLE 6

Into a reactor provided with a stirrer and a reflux condenser were fed 90 parts of AN, 10 parts of 2,2,2-trifluoroethyl acrylate (hereinafter 3FA), 400 parts of water, 200 parts of DMAc and 0.1 part of 2,2-azobis(4-methoxy-2,4-dimethylvaleronitrile). Each of AN, 3FA, water and DMAc was used after having been subjected to nitrogen bubbling for 1 hour. The mixture in the reactor was subjected to polymerization at 50° C. for 3 hours in a nitrogen stream. The yield of the resulting polymer was 67%. The polymer was subjected to elemental analysis of fluorine, and calculation from the analysis indicated that the polymer had a composition consisting of 82% of AN and 18% of 3FA. This was also confirmed by NMR measurement. The polymer had an intrinsic viscosity $[\eta]$ of 2.65.

The polymer was dissolved in dimethylformamide in a 22% concentration. The resulting solution as a spinning solution was dry-spun according to a conventional procedure in an atmosphere of 180° C.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes The property showed no change even after 50 times of washing.

EXAMPLE 7

Into a reactor provided with a stirrer and a reflux condenser were fed 90 parts of AN, 1H,1H,1H,1H-heptadecafluorodecyl acrylate (hereinafter 17FA), 400 parts of water, 200 parts of DMF and 0.1 part of 2,2-azobis(4-methoxy-2,4-dimethylvaleronitrile). Each of AN, 17FA, water and DMF was used after having been subjected to nitrogen bubbling for 1 hour. The mixture in the reactor was subjected to polymerization at 50° C. for 3 hours in a nitrogen stream. The yield of the resulting polymer was 64%. The polymer was subjected to elemental analysis of fluorine, and calculation from the analysis indicated that the polymer had a composition consisting of 84% of AN and 16% of 17FA. The polymer had an intrinsic viscosity $[\eta]$ of 2.79.

The polymer was dissolved in dimethylformamide in a 16% concentration. The resulting solution was wet-spun according to a conventional procedure using a 70% aqueous dimethylacetamide solution as a coagulating solution, after which drawing to a 4.5-fold length was conducted in boiling water to obtain a fiber. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes. The property showed no change even after 50 times of washing.

COMPARATIVE EXAMPLE 1

Into a reactor provided with a stirrer and a reflux condenser were fed 75 parts of AN, 25 parts of 3FA, 400 parts of water, 200 parts of DMAc and 1 part of 2,2-azobis(4-methoxy-2,4-dimethylvaleronitrile). Each of AN, 3FA, water and DMAc was used after having been subjected to nitrogen bubbling for 1 hour. The mixture in the reactor was subjected to polymerization at 50° C. for 3 hours in a nitrogen stream. The yield of the resulting polymer was 87%. The polymer was subjected to elemental analysis of fluorine, and calculation from the analysis indicated that the polymer had a composition consisting of 71% of AN and 29% of 3FA. The polymer had an intrinsic viscosity $[\eta]$ of 0.08. It was tried to wet-spin the polymer, but the spinning was impossible because the polymer had no spinnability.

COMPARATIVE EXAMPLE 2

Into a reactor provided with a stirrer and a reflux condenser were fed 50 parts of AN, 50 parts of 17FM, 400 parts of water, 200 parts of DMAc and 0.1 part of 2,2-azobis(4-methoxy-2,4-dimethylvaleronitrile). Each of AN, 17FM, water and DMAc was used after having been subjected to nitrogen bubbling for 1 hour. The mixture in the reactor was subjected to polymerization at 50° C. for 3 hours in a nitrogen stream. The yield of the resulting polymer was 49%. The polymer was subjected to elemental analysis of fluorine, and calculation from the analysis indicated that the polymer had a composition consisting of 42% of AN and 58% of 17FM. The polymer had an intrinsic viscosity $[\eta]$ of 2.03. It was tried to dissolve the polymer in DMF in order to spin the polymer, but the dissolution was impossible.

EXAMPLE 8

A mixture consisting of 90 parts of acrylonitrile, 10 parts of 17FM and 0.1 part of azobisisobutyronitrile as a polymerization initiator, was subjected to polymerization in 200 parts of water and 100 parts of diethylacetamide at 50° C. for 3 hours to obtain a polymer composed of 80% of acrylonitrile and 20% of 17FM, having an intrinsic viscosity $[\eta]$ of 4.0.

The polymer was dissolved in dimethylacetamide in a 15% concentration. The resulting solution was wet-spun according to a conventional procedure using a 70% aqueous dimethylacetamide solution as a coagulating solution, after which drawing to a 4.5-fold length was conducted in boiling water to obtain a fiber. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes. The property showed no change even after 50 times of washing.

EXAMPLE 9

A mixture consisting of 70 parts of acrylonitrile, 30 parts of 17FM and 0.2 part of sodium persulfate as a polymerization initiator, was subjected to polymerization in 300 parts of water at 60° C. for 3 hours to obtain a polymer composed of 95% of acrylonitrile and 5% of 17FM, having an intrinsic viscosity $[\eta]$ of 3.5.

The polymer was dissolved in dimethylformamide in a 21% concentration. The resulting solution as a spinning solution was dry-spun according to a conventional procedure in an atmosphere of 180° C.

The resulting fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The same water repellency was confirmed even after a steam treatment at 140° C. for 10 minutes. The property showed no change even after 50 times of washing.

EXAMPLE 10

A mixture consisting of 90 parts of acrylonitrile, 10 parts of 17FM and 0.1 part of azobisisobutyronitrile as a polymerization initiator, was subjected to polymerization in 200 parts of water and 100 parts of dimethylacetamide at 50° C. for 3 hours to obtain a polymer composed of 80% of acrylonitrile and 20% of 17FM having an intrinsic viscosity $[\eta]$ of 4.0.

Using, as a sheath component, a dimethylacetamide solution containing the above polymer in a 15% concentration and, as a core component, a dimethylacetamide solution containing a polyacrylonitrile having an intrinsic viscosity $[\eta]$ of 2.6, in a 15% concentration, wet spinning was conducted in a 70% aqueous dimethylacetamide solution as a coagulating solution, using a spinneret for core-sheath conjugate spinning, after which drawing to a 4.5-fold length was conducted in boiling water to obtain a fiber of 20 μm in diameter, 17.3 μm in core diameter, 4.5 g/d in strength and 15% in elongation. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The property showed no change even after 50 times of washing.

EXAMPLE 11

A mixture consisting of 90 parts of acrylonitrile, 10 parts of 17FM and 0.1 part of azobisisobutyronitrile as a polymerization initiator, was subjected to polymerization in 400 parts of water and 200 parts of dimethylacetamide at 60° C. for 3 hours to obtain a polymer composed of 88% of acrylonitrile and 12% of 17FM, having an intrinsic viscosity $[\eta]$ of 2.8.

Using, as a sheath component, a dimethylacetamide solution containing the above polymer in a 17% concentration and, as a core component, a dimethylacetamide solution containing a copolymer composed of 90% of acrylonitrile and 10% of vinyl acetate, having an intrinsic viscosity $[\eta]$ of 1.5, in a 25% concentration, wet spinning was conducted in a 70% aqueous dimethylacetamide solution as a coagulating solution, using a spinneret for core-sheath conjugate spinning, after which drawing to a 4.5-fold length was conducted in boiling water to obtain a fiber of 20 μm in diameter, 17.3 μm in core diameter, 3.0 g/d in strength and 20% in elongation. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The property showed no change even after 50 times of washing.

EXAMPLE 12

A mixture consisting of 85 parts of acrylonitrile, 15 parts of 8FM and 0.1 part of azobisisobutyronitrile as a polymerization initiator, was subjected to polymerization in 200 parts of water and 100 parts of dimethylacetamide at 50° C. for 3 hours to obtain a polymer composed of 83% of acrylonitrile and 17% of 8FM, having an intrinsic viscosity $[\eta]$ of 2.8.

Using, as a sheath component, a dimethylacetamide solution containing the above polymer in a 17% concentration and, as a core component, a dimethylacetamide solution containing a copolymer composed of 95% of acrylonitrile and 5% of methyl acrylate, having an intrinsic viscosity $[\eta]$ of 1.6, in a 24% concentration, wet spinning was conducted in a 70% aqueous dimethylacetamide solution as a coagulating solution, using a spinneret for core-sheath conjugate spinning, after which drawing to a 4.5-fold length was conducted in boiling water to obtain a fiber of 25 μm in diameter, 20 μm in core diameter, 3.0 g/d in strength and 18% in elongation. There was no problem in the spinning step.

The fiber was made into a 1/5'S spun yarn by a semi-worsted spinning method. With the spun yarn, a cut pile carpet was prepared using a 1/10G tufting machine.

The water repellency of the carpet was grade 5 and no problem occurred in each processing step. The property showed no change even after 50 times of washing.

EXAMPLE 13

Into a reactor provided with a stirrer and a reflux condenser were fed 90 parts of AN, 10 parts of 17FM, 600 parts of water, 0.75 part of $(NH_4)_2S_2O_8$, 3.07 parts of $NaHSO_3$, 0.25 part of $H_2SO_4$ and 0.4 ppm, relative to the monomers, of $Fe^{2+}$. Each of AN, 17FM and water was used after having been subjected to nitrogen bubbling for 1 hour. The mixture in the reactor was subjected to polymerization at 50° C. for 3 hours in a nitrogen stream. The yield of the resulting polymer was 80%. The polymer was subjected to elemental analysis of fluorine, and calculation from the analysis indicated that the polymer had a composition consisting of 87% of AN and 13% of 17FM. The polymer had an intrinsic viscosity [$\eta$] of 1.85.

Using, as a sheath component, a dimethylacetamide solution containing the above polymer in a 22% concentration and, as a core component, a dimethylformamide solution containing 98% of acrylonitrile having an intrinsic viscosity [$\eta$] of 1.5 and 2% of vinyl acetate, in a 30% concentration, dry spinning was conducted in an atmosphere of 180° according to a conventional procedure, using a spinneret for core-sheath conjugate spinning, to obtain a fiber of 20 μm in diameter, 18 μm in core diameter, 2.8 g/d in strength and 25% of elongation.

The fiber was made into a 1/5'S spun yarn by a semi-worsted spinning method With the spun yarn, a cut pile carpet was prepared using a 1/10G tufting machine.

The water repellency of the carpet was grade 5 and no problem occurred in each processing step. The property showed no change even after 50 times of washing.

We claim:

1. An acrylonitrile copolymer comprising 70% by weight or more of an acrylonitrile monomer unit and 0.1-30% by weight of a fluoroalkyl methacrylate or fluoroalkyl acrylate monomer unit and having an intrinsic viscosity of 0.8-10.

2. A copolymer according to claim 1, wherein the fluoroalkyl methacrylate or fluoroalkyl acrylate has an alcohol moiety selected from the group consisting of $CF_3(CF_2)_nCH_2OH$ (n=0, 1, 2, 3, 5), $CHF_2(CF_2)_nCH_2OH$ (n=1, 3) and $CF_3(CF_2)_7CH_2CH_2OH$.

* * * * *